United States Patent
Janick et al.

(10) Patent No.: US 6,765,550 B2
(45) Date of Patent: Jul. 20, 2004

(54) PRIVACY FILTER APPARATUS FOR A NOTEBOOK COMPUTER DISPLAY

(75) Inventors: Jan Michael Janick, Morrisville, NC (US); Howard Jeffrey Locker, Cary, NC (US); Russell Alan Resnick, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 393 days.

(21) Appl. No.: 09/844,586

(22) Filed: Apr. 27, 2001

(65) Prior Publication Data

US 2002/0158967 A1 Oct. 31, 2002

(51) Int. Cl.⁷ .............................................. G09G 3/36
(52) U.S. Cl. ...................................................... 345/87
(58) Field of Search ........................ 345/87; 353/104; 359/609; 349/497, 12, 117; 348/744

(56) References Cited

U.S. PATENT DOCUMENTS

| | | | | |
|---|---|---|---|---|
| 3,724,524 A | * | 4/1973 | Potter ............................. 160/24 |
| 4,444,465 A | | 4/1984 | Giulie et al. ............. 350/276 R |
| 4,633,322 A | | 12/1986 | Fourny ......................... 358/252 |
| 4,764,410 A | * | 8/1988 | Grzywinski ................. 428/120 |
| 4,766,023 A | | 8/1988 | Lu ................................ 420/120 |
| 4,812,709 A | | 3/1989 | Dudasik ....................... 313/478 |
| 4,819,085 A | | 4/1989 | Liang .......................... 358/245 |
| 4,849,874 A | | 7/1989 | Buck et al. .................. 350/276 |
| 5,030,882 A | * | 7/1991 | Solero .......................... 313/478 |
| 5,103,327 A | | 4/1992 | Hirai et al. .................... 359/51 |
| 5,444,506 A | * | 8/1995 | Nakazawa et al. .......... 353/104 |
| 5,488,496 A | | 1/1996 | Pine .............................. 359/63 |
| 5,526,146 A | | 6/1996 | Goodman et al. ............. 359/40 |
| 5,528,319 A | * | 6/1996 | Austin ......................... 348/835 |
| 5,570,138 A | * | 10/1996 | Baron .......................... 348/744 |
| 5,608,482 A | * | 3/1997 | Watkins et al. ................. 396/6 |
| RE35,691 E | | 12/1997 | Theirl et al. ................. 359/609 |
| 5,717,566 A | * | 2/1998 | Tao .............................. 361/681 |
| 5,877,896 A | * | 3/1999 | Gremban ..................... 359/601 |
| 5,909,315 A | * | 6/1999 | Keehn ......................... 359/609 |
| 5,993,940 A | | 11/1999 | Ouderkirk et al. .......... 428/167 |
| 6,125,525 A | | 10/2000 | Brock ...................... 29/525.01 |
| 6,211,930 B1 | | 4/2001 | Sautter et al. ................. 349/66 |
| 6,239,853 B1 | * | 5/2001 | Winker et al. .............. 349/117 |
| 6,243,130 B1 | * | 6/2001 | McNelley et al. ........... 725/105 |
| 6,307,676 B1 | * | 10/2001 | Merrill et al. ............... 359/497 |
| 6,460,593 B1 | * | 10/2002 | Floyd ..................... 160/370.22 |
| 6,563,554 B2 | * | 5/2003 | Okamoto et al. ............. 349/12 |

OTHER PUBLICATIONS

3M PF14.1 Notebook Privacy Filter literature, published at www2.warehouse.com.

* cited by examiner

Primary Examiner—Bipin Shalwala
Assistant Examiner—Prabodh Dharia
(74) Attorney, Agent, or Firm—Ronald V. Davidge; Carlos Munoz-Bustamante

(57) ABSTRACT

The display of a notebook computer includes a privacy filter extending over the display screen to limit the viewing angle within which the image on the screen can be discerned. To allow for normal viewing when the privacy feature is not required, the privacy filter is movable from the screen by sliding into a cavity extending from one side of the screen to be rolled onto a roller or to be stored partly behind the screen. Alternately, a privacy filter is provided that is electrically switchable between a mode in which the viewing angle is limited and a mode in which normal viewing is permitted. The movable privacy filter includes closely spaced louvers surrounded by clear plastic or, alternately, a polarizer. The switchable privacy filter includes a liquid crystal device and a polarizer.

12 Claims, 3 Drawing Sheets

PRIVACY FILTER APPARATUS FOR A NOTEBOOK COMPUTER DISPLAY

BACKGROUND OF THE INVENTION

1. Field of the Invention

This invention relates to apparatus providing for private viewing of information displayed on the LCD screen of a notebook or laptop computer, and, more particularly, to a filtering device extending in front of an LCD screen, having an active mode in which a limitation is placed on the viewing angle through which data on the screen can be read and an inactive mode, in which the screen can be viewed normally.

2. Background Art

Laptop or notebook computers are often used in crowded, public places such as airplanes for writing personal or otherwise confidential information. Under such circumstances, there is generally a concern the a nearby person, such as the person in the next airplane seat, may be reading sensitive material. This concern keeps many people from using a laptop computer in many instances when its use would be particularly convenient. If the computer is used in this way, sensitive data may be stolen.

Privacy can be provided during the use of a laptop computer by restricting the viewing angle through which the screen may be viewed, so that only the person sitting directly in front of the screen can read the data written on it. This angle can be limited by holding a privacy screen across the front of the computer display screen, so that the display screen can only be viewed through the privacy screen.

FIG. 1 is a fragmentary cross-sectional view of a first type of privacy screen 10 placed in front of a computer display screen 12. The privacy screen 10 includes a number of partitions 14 separated by transparent light channels 16. The partitions 14 limit the angle at which light is transmitted through the privacy screen 10 to the angle indicated by the reference numeral 18. When a portion of the screen is viewed from outside this angle, it appears to be dark. If the partitions 14 extend only vertically, the angle of view is limited from side to side, so that a person sitting next the person using the computer is prevented from reading the data on the screen. If the partitions 14 extend horizontally, as well as vertically, the angle of view is also limited vertically, so that a person standing behind the person sitting and using the computer is also prevented from reading the data on the screen. An example of a privacy screen having closely-spaced partitions or louvers is sold by the 3M Company as a PF14.1 Notebook Privacy Filter.

The partitions may be small louvers, ridges, or other shapes. A number of examples from the patent literature describe ways of making and using films including such shapes. For example, U.S. Pat. No. 4,766,023 describes a louvered plastic film that can be more easily handled and installed by coating at least one surface with a solvent-free monomer composition and exposing the coating to ultraviolet radiation to polymerize the coating. U.S. Pat. No. 4,764,410 describes such a film in which the coating is polymerized to an adhesive state, preferably forming a pressure-sensitive adhesive. U.S. Pat. No. 4,812,702 describes a privacy screen using a pair of films with small louvers, placed against one another so that the image from a color CRT must pass through both the films. The louvers of each of the films are tilted in opposite directions at angles from the vertical, substantially reducing any visual Moire patterns resulting from an interaction between the pixels on the CRT screen and the louvers. U.S. Pat. No. 5,528,319 describes a privacy filter having two or more aligned and spaced-apart grids, each of which includes an array of strips blocking light transmission. U.S. Pat. No. 5,993,940 describes a composite including a polymeric film having a first generally planar major surface and an opposite second major surface defined by a multiplicity of elongate parallel contiguous ridge portions, each of which has a generally triangular cross section. The film can provide visual transmission between its first major surface and its second major surface, while coatings along obscured portions of the second major surface prevent viewing of visual images through the film.

The patents referenced above do not describe a means for selectively providing the effect of the louvers or partitions. Such means for selectively providing is particularly desirable in the application of a method for achieving privacy in the use of a notebook computer, since such a device is typically used both in public places, such as airplanes and waiting rooms, requiring such privacy, and in more private places, where there is no need for such privacy. In such more private places, a failure to cancel the effect of the louvers or partitions means that the notebook computer is unnecessarily difficult to use, first because the privacy film covering the screen of the computer absorbs a significant portion of the light used to form the image visible on the screen, and second because it is often more difficult to use a computer when the screen has a narrow angle of view. In particular, what is needed is a convenient way to move a louvered privacy filter into place in front of the LCD screen of a notebook computer for use in a situation requiring privacy, and to move the louvered privacy filter out of place to be stored within the notebook computer for use in a situation not requiring privacy.

One method for varying the angle through which an LCD screen may be viewed is described in U.S. Pat. No. 6,211,930, which describes variable viewing angle LCD systems for use in automatic teller machines where, during parts of a transaction, it is desirable that information on the screen can be read only by the person using the machine and standing directly in front of the screen. The system includes conventional elements for backlighting a transmission type LCD screen, with such conventional backlighting elements including a reflector, a light source, and an optional brightness enhancer. A collimator and a variable diffuser are interposed between these conventional backlighting elements and the LCD screen. The collimator consists of a pair of louver films through which light passes only in essentially straight lines. The variable diffuser, which can be switched between a transparent state and a scattering state by the application of an electric field, may be a polymer dispersed liquid crystal cell or reverse mode polymer stabilized collisteric texture cell. When the variable diffuser is in its transparent state, the light passing through the LCD screen remains collimated, so that the screen is only visible over a narrow viewing angle. When the variable diffuser is set to scatter the collimated light, light passes through the LCD screen at a range of angles, so a large angle of viewing is made available.

What is needed is a method for varying the angle of view without requiring the illumination for wide angles to be first collimated and then scattered. The process of collimating absorbs much of the illumination, in the form of light not passing through the louvers in essentially straight lines. Then, for wide angle viewing, the light is scattered by the diffuser, lowering the peak level of illumination at a viewing angle perpendicular to the screen.

FIG. 2 is a fragmentary cross-sectional view of a second type of privacy screen 20 placed in front of a liquid crystal display (LCD) screen 22. This privacy screen 20 is a polarizing film, which takes advantage of the fact that the light output of the LCD 22, is strongly polarized. The LCD screen 22 is of a conventional type, including a light source 26, such as a flourescent light; a diffuser 27, which directs light from the light source in the outward direction of arrow 28; an inner polarizing filter 30; a liquid crystal panel 32 including liquid crystal material 34, extending between a pair of glass plates 36; and an outer polarizing filter 38. Light emitted by the light source 26 is polarized by the inner polarizing filter in a first direction, forming a plane polarized area of illumination passing through the liquid crystal panel 32 and through the outer polarizing filter 38, which is aligned to pass light polarized in this direction.

The liquid crystal panel 32 is capable of forming cross-polarized images against this plane polarized background light. For example, the liquid crystal material 34 comprises mesomorphic crystals which align themselves with an electric field. When these crystals are aligned in this way, polarized light passing through them is rotated into a condition of cross-polarization with the outer polarizing filter 38, so that the light is absorbed by the outer polarizing filter 38. When the electric field is removed, the alignment of the crystals returns to a random state, so that polarized light passes through the liquid crystal panel 32 without this rotation. Thus, with the electric field removed the plane polarized light passes through the liquid crystal panel 32, retaining this plane polarization, and thus also passes through the outer polarizing filter 38. The glass plates 36 include embedded electrodes, which are selectively driven to produce an electric field forming alphanumeric characters and graphics. A color display is formed by including patterns of red, green, and blue dots within the light path to form colored pixels. The angle through which the image formed by the liquid crystal panel 32 may be effectively viewed is limited by imposing a polarizing privacy filter 20 between the outer polarizing filter 38 and the viewer (not shown). The polarizing privacy filter 20 is aligned to be partially cross-polarizing with the plane polarized light transmitted through the liquid crystal panel 32 without rotation. While the polarizing privacy filter 38 darkens the illuminated areas of the displayed information, even when the image is viewed from a direction indicated by line 42, perpendicular to the plane of the liquid crystal panel 32, this darkening effect resulting from interposing the polarizing privacy filter 38 is much greater when the image is viewed from an oblique angle, as indicated by line 44. Thus, the effective viewing angle of the displayed image is substantially reduced. U.S. Pat. No. 5,488,496 describes this kind of privacy filter in configurations in which at least one of the polarizers associated with creating a cross-polarized image on a liquid crystal display is displaceable. One of these configurations includes cylindrical rollers extending above and below an LCD, with a clear, transparent continuous belt made from a material such as acetate film being tensioned between the rollers. The polarizing privacy filter is constructed on one region of the belt, with this region being the height and width of the LCD. This privacy filter is moved into position between the LCD and the view, and subsequently out of this position, by rotation of one of the rollers using a crank or an electric motor.

What is needed is a method for moving a privacy filter between a position in which it is hidden and a position in which it extends in front of the LCD of a notebook computer without a need to attach the privacy filter to a transparent belt. Such a method would eliminate a need to establish a belt tracking system and would eliminate covering the LCD with a plastic sheet even when the privacy filter is moved away from the LCD screen.

Another method for achieving privacy when viewing a computer screen is to provide opaque members extending outward from the sides and top of the screen, as described in U.S. Pat. Nos. 4,444,465, 5,717,566, and 5,877,896. While this method has the additional advantage of minimizing glare on the computer screen, and can be used entirely to control glare, it is of limited use in crowded conditions such as airplanes because of the bulkiness of the associated devices.

Screens have also been described as being used to reduce glare when viewing cathode ray tube (CRT) displays, including television sets. U.S. Pat. No. 4,819,085 describes a protective screen formed of a frame and a series of woven, non-metallic fibers, which is fitted over a display surface of a CRT to reduce glare and/or to diffuse emanated radiation and static electricity. U.S. Pat. No. 4,633,322 describes a filter, composed of a woven micromesh screen, held in front of a the CRT screen of a television set, and removed from the CRT by being rolled onto a roller when the television set is not being used to prevent an accumulation of dust in the filter mesh.

What is needed is a mechanism providing for a conveniently removed privacy filter composed of, for example, a louvered film.

SUMMARY OF THE INVENTION

Accordingly, an objective of the invention is to provide apparatus for a notebook computer in which a privacy filter, limiting the angle at which the display screen can be viewed, is readily made effective and ineffective;

Another objective of the invention is to provide a privacy filter which is easily brought into place in front of the display screen of a notebook computer for use in situations requiring privacy and moved into a storage cavity within the notebook computer for use in situations not requiring privacy;

According to a first aspect of the invention, display apparatus for a computing system is provided, including a display panel, a display cover, and a privacy filter. The display panel includes a display surface and causes a visible image to be produced on said display surface in response to electrical signals generated within said computing system. The display cover, which extends around said display panel, includes a window outwardly exposing said display surface and a cavity extending from a first end of said window to a closed end of said cavity. The privacy filter, which includes a filter sheet, is movable between a closed position with said filter sheet extending to cover said display surface and an open position exposing said display surface through said window. A first portion of said privacy filter in said open and closed positions extends into said cavity. The filter sheet limits a viewing angle through which said visible image is discernible.

The display apparatus may additionally include a roll rotatably mounted within said cavity, with a first end of said privacy filter being attached to a peripheral surface of said roll. Rotating said roll in a first direction wraps an increasing portion of said privacy filter around said roll, moving said privacy filter from said closed position to said open position, and rotating said roll opposite said first direction unwraps an increasing portion of said privacy filter from said roll, moving said privacy filter from said open position to said closed position.

Alternately, the cavity may include a rear cavity portion extending along a side of said display panel opposite said display surface, with the display apparatus additionally including a curved deflector deflecting a portion of said privacy filter into said rear cavity portion as said privacy filter is moved from said open position into said closed position.

According to a second aspect of the invention, display apparatus for a computing system is provided, including a display panel, a liquid crystal device, and an external polarizer. The display panel, which includes a display surface, causes a visible image to be produced on said display surface. The visual image includes darkened areas and illuminated areas having light polarized in a first plane. The liquid crystal device extends externally across said display surface, with the display surface being visible through said liquid crystal device. The external polarizer extends externally across said liquid crystal device, which is electrically switchable between a first mode causing light from said illuminated areas to be cross-polarized with said polarizer and a second mode causing light from said illuminated areas to be plane polarized with said external polarizer.

DETAILED DESCRIPTION OF THE INVENTION

Figure 3:
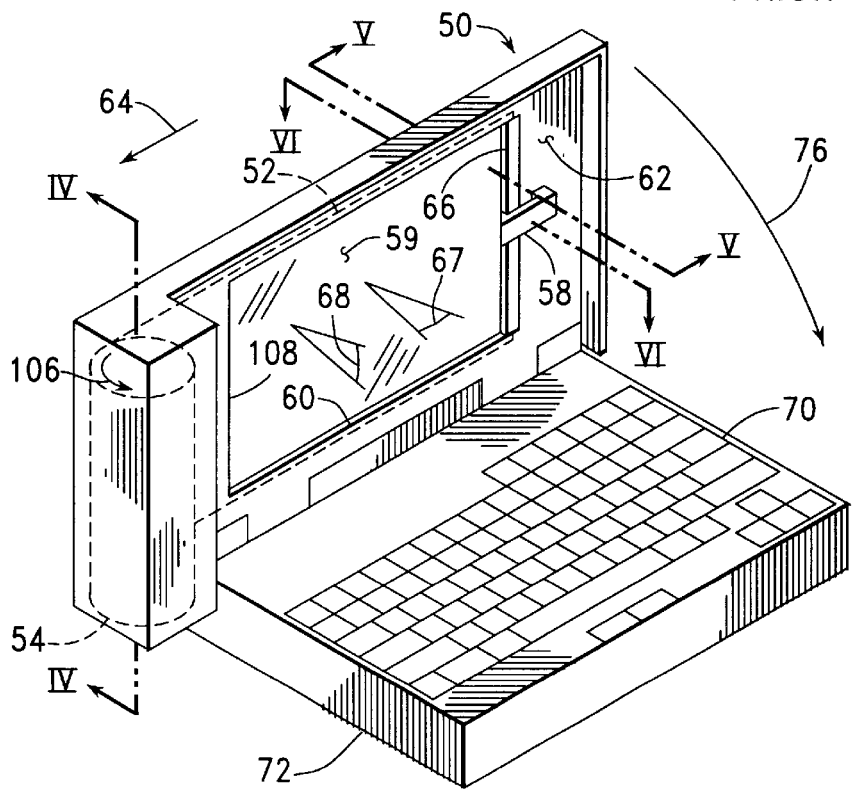
FIG. 3 is a perspective view of a notebook computer built in accordance with a first embodiment of the present invention to include a movable privacy filter.
Figure 4:
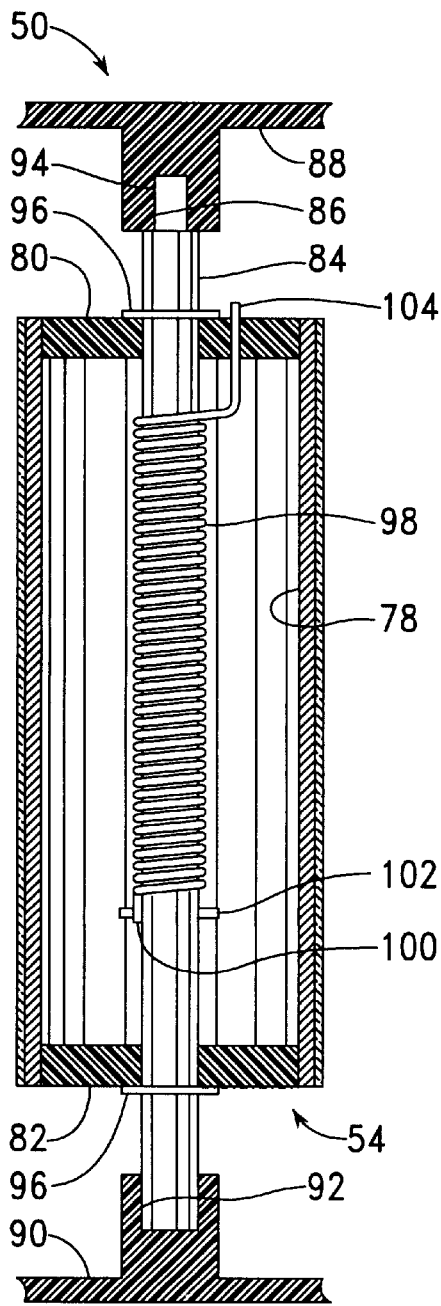
FIG. 4 is a fragmentary vertical cross-sectional view of the notebook computer of FIG. 3, taken as indicated by section lines IV—IV therein to show a storage roller holding a portion of the movable privacy filter.
Figure 5:
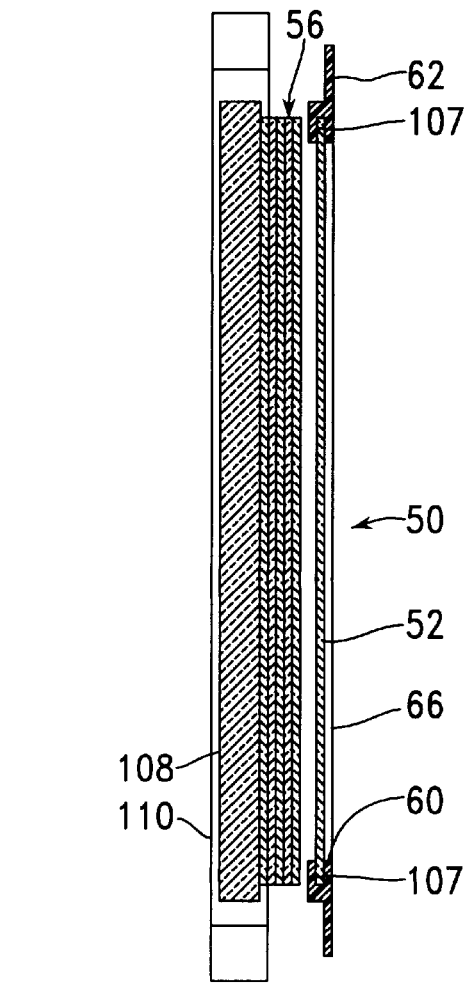
FIG. 5 is a fragmentary vertical cross-sectional view of the notebook computer of FIG. 3, taken as indicated by section lines V—V therein to show a privacy filter held in place in front of a liquid crystal display.
Figure 6:
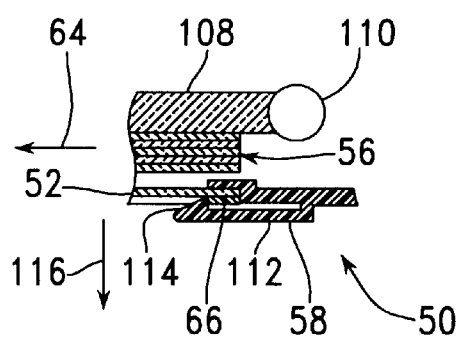
FIG. 6 is a fragmentary cross-sectional plan view of the notebook computer of FIG. 3, taken as indicated by section lines VI—VI therein to show a latching structure holding the privacy filter in place.

FIGS. 3–6 show a notebook computer 50 built in accordance with a first embodiment of the present invention to include a movable privacy filter 52. FIG. 3 is a perspective view of the notebook computer 50, while FIG. 4 is a first fragmentary vertical cross-sectional view of the notebook computer 50, taken as indicated by section lines IV—IV in FIG. 3 to show a storage roller 54 holding a portion of the privacy filter 52. FIG. 5 is a second fragmentary vertical cross-sectional view of the notebook computer 50, taken as indicated by section lines V—V in FIG. 3 to show the movable privacy filter 52 extending in front of a liquid crystal display (LCD) 56. FIG. 6 is a fragmentary cross-sectional plan view of the notebook computer 50, taken as indicated by section lines VI—VI in FIG. 3 to show a latch 58 holding the movably privacy filter 52 in it fully extended condition, in front of the LCD 56.

Referring first to FIG. 3, a notebook computer 50 includes a privacy filter 52, having a flexible filter sheet 59, extending within a window 60 in a display cover 62, in front of the LCD 56 (shown in FIG. 5). The privacy filter 52 extends to the left, in the direction of arrow 64, from the window 60, being attached by means of an adhesive or by clamping means to a peripheral surface of the roller 54. The privacy filter 52 includes a bar 66, adhesively attached or clamped to a right end of the filter sheet 59, to be held in place, with the privacy filter 52 fully extended to the right, opposite the direction of arrow 64. The flexible filter sheet 59 is understood to be composed of a flexible material, which is at least partially transparent, but which limits the angle 67, in a horizontal plane, through which the LCD 56 may be effectively viewed. Depending on the composition of the filter sheet 59, a viewing angle 68 in a vertical plane may also be limited.

The filter sheet 59 may include a number of louvers or partitions. For example, the filter sheet 59 may be formed as described in U.S. Pat. No. 4,766,023, the disclosure of which is incorporated herein by reference, to have at least one surface coated with a solvent-free monomer composition. The filter sheet 59 may comprise a pair of films, attached to one another to so that light forming an image from the LCD 56 must pass through both of the films, with the two films being aligned so that the louvers within them are rotated in opposite directions from the vertical, as described in U.S. Pat. No. 4,812,702, the disclosure of which is also incorporated herein by reference. The filter sheet 59 may include two or more aligned and spaced-apart grids, each of which includes an array of strips blocking light transmission, as described in U.S. Pat. No. 5,528,319 the disclosure of which is also incorporated herein by reference. The filter sheet 59 may include a polymeric film having a first generally planar major surface and an opposite second major surface defined by a multiplicity of elongate parallel contiguous ridge portions, each of which has a generally triangular cross section. The film can provide visual transmission between its first major surface and its second major surface, while coatings along obscured portions of the second major surface prevent viewing of visual images through the film, as described in U.S. Pat. No. 5,993,940 the disclosure of which is also incorporated herein by reference.

A filter sheet 59 including such louvers or partitions blocks the transmission of light at angles outside a particular viewing angle, with light within the viewing angle being transmitted directly through the individual clear spaces between the louvers or partitions.

Alternately, the filter sheet 59 may be formed as described within U.S. Pat. No. 6,488,496, the disclosure of which is also incorporated herein by reference, being composed of a polarizing film oriented so that it is cross-polarized with the light emitted within the illuminated areas of the LCD 56.

A filter sheet 59 including a polarizing film oriented in this way darkens the illuminated areas in the image formed by the LCD 56, with this darkening effect being markedly increased as the LCD 56 is viewed at larger angle from the normal to the surface of the filter sheet 59. Thus, the angle through which an image formed by the LCD 56 is discernible by a viewer is again substantially limited by the filter sheet 59.

The notebook computer 50 may otherwise by of conventional construction including a number of keys 70 which are depressed to provide an input from the user and conventional computer devices, such as a processor and data storage (not shown). The notebook computer 50 includes a forward-extending lower portion and an upper portion 74, which is pivotally mounted along the rear edge of the lower portion 72 to be opened, as shown, or to be closed by pivoting movement in the direction of arrow 76.

Continuing to refer to FIG. 3, and referring additionally to FIG. 4, the roller 54 includes a cylinder 78, an upper end cap 80 and a lower end cap 82. The roller 54 rotates on a stationary shaft 84, which is held in place between an upper socket 86 within an upper cover member 88 and a lower socket 90 in a lower cover member 92. A non-circular upper portion 94 of the shaft 84 extends within a non-circular upper socket 86 to prevent rotation of the shaft 84. While the roller 54 rotates on the shaft 84, it is held between a pair of retaining clips 96 within slots in the shaft 84. A torsion spring 98, having a lower end 100 resting against a pin 102, extending through the shaft 84, and an upper end 104 extending through the upper end cap 80 of the roller 54, applies a torque in the direction of arrow 106 to the privacy filter 52, which is attached to the cylinder 78 of the roller 54, holding the privacy filter 52 under tension when it is latched in its fully extended condition, as shown in FIG. 3, and wrapping the privacy filter 52 around the roller 53 when the latch 58 is released to move in the direction of arrow 64. This motion is limited by contact between the bar 66 and the left edge 108 of the window 60, so that the bar 66 may be used to move the privacy filter 52 in either direction between a fully extended condition and a fully open condition.

Referring to FIG. 5, the privacy filter 52 extends within slots 107 along the upper and lower edges of the window 60 in the display cover 62, being held in place in front of the LCD 56. The LCD 56 is illuminated from the rear through a diffuser 108 extending between a pair of fluorescent lamps 110. The diffuser 108 is, for example, composed of a white translucent plastic resin.

Referring to FIG. 6, the latch 58 includes a flexible section 112 allowing deflection of the tip 114 of the latch 58 in the outward direction of arrow 115 as the bar 66 of the privacy filter 52 is moved opposite the direction of arrow 64 by the inclined surface of the tip 114. When the bar 66 is moved past the inclined surface of the tip 114, the latch 58 snaps inward, opposite the direction of arrow 115 to hold the privacy filter 52 in its fully extended position. Then, the tip 114 can be moved outward, in the direction of arrow 115, to release the latch 58, allowing the privacy filter 52 to move in the direction of arrow 64.

Figure 7:
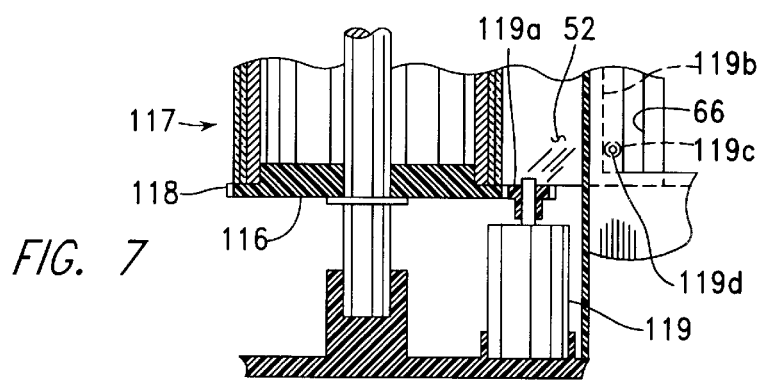
FIG. 7 is a fragmentary vertical cross-sectional view of the notebook computer of FIG. 3, taken as indicated by section lines IV—IV therein to show an alternate storage roller holding a portion of the movable privacy filter.

FIG. 7 is a fragmentary vertical cross-sectional view of the notebook computer 50, taken as indicated by section lines IV—IV in FIG. 3 to shown an alternative arrangement for rolling up the privacy filter 52. In this arrangement, the lower end cap 116 of the roller 117 includes a gear portion 118 driven by a motor 119 through a gear 119a. Means are also provided to determine when the privacy filter 136 has reached either end of its allowed motion. For example, the bar 66 moves into a slot 119b at each (left and right) side of the window 108, with a light emitting diode 119c directing light through the slot 119b toward a photodetector 119d and with the light path between the light emitting diode 119c and the photodetector 119d being blocked by the movement of the bar 66 into the slot 119b.

Thus, to open the privacy filter 52, so that the LCD 56 can be viewed without its influence, the motor 119 is turned on to move the roller 117 in the direction of arrow 106 (shown in FIG. 3) until the photodetector 119d at the left side of the window 108 indicates that the bar 66 has moved into the slot 119b on the left side of the window 108. To close the privacy filter 52, so that the viewing angle of the LCD 56 is significantly reduced, the motor 119 is turned on to move the roller 117 opposite the direction of arrow 106 until the photodetector 119d at the right side of the window 108 indicates that the bar 66 has moved into the slot 119b on the right side of the window 108. The motor 119 is preferably operated under control of a routine executing within a processor in the computing system 50, with an input being provided by the user through the keyboard to begin the process of moving the privacy filter 52. The motor 119 and associated gearing preferably have enough friction to hold the privacy filter 52 in either its open or closed positions, allowing the elimination of the latch 58 (shown in FIG. 3) and the spring 98 (shown in FIG. 4).

Figure 8:
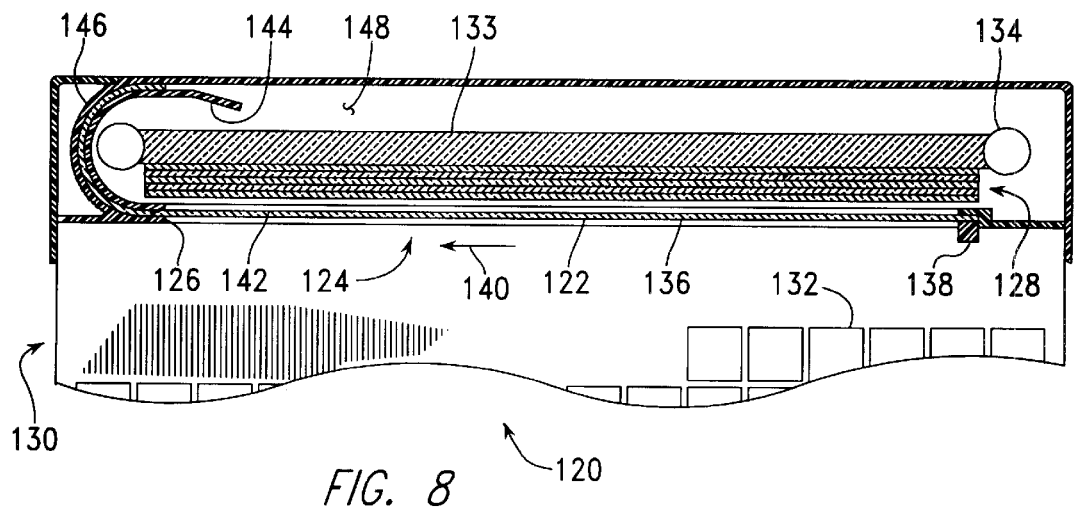
FIG. 8 is a fragmentary cross-sectional plan view of a notebook computer built in accordance with a second embodiment of the present invention to include a movable privacy filter.

FIG. 8 is a fragmentary cross-sectional plan view of a notebook computer 120 built in accordance with a second embodiment of the present invention to include a movable privacy filter 122. The notebook computer 120 includes an upper section 124 having a window 126 through which an LCD 128 is visible, and a lower section 130, having a number of keys 132 used to provide conventional user inputs. The upper section 124, which is preferably pivotally mounted on the lower section 130, is shown extending straight upward. The LCD 128 may again be of a conventional type, producing either monochromatic or color images, being illuminated from behind by a diffuser 133 extending between fluorescent tubes 134.

The movable privacy filter 122 includes a flexible filter sheet 136 which is composed as the filter sheet 59 of the first embodiment, composed as the flexible filter sheet 59, described above in reference to FIG. 3. When the filter sheet 136 is held across the front of the LCD 128, as shown, the notebook computer 120 may be used with relative privacy, since the effective angle through which the LCD 128 can be viewed is substantially reduced. The movable privacy filter 122 also includes a sliding bar 138, attached by an adhesive or by clamping to the right end of the filter sheet 136, which is used to move the privacy filter 122 between the closed position in which it is shown and an open position, with the filter sheet 136 moved leftward, in the direction of arrow 140, to expose the LCD 128 for direct viewing without the intervention of the filter sheet 136.

The notebook computer 120, built in accordance with the second embodiment, is also similar to the notebook computer 50, built in accordance with the first embodiment, in that upper and lower edges of the privacy filter 122 extend into slots 142 in the upper and lower edges of the window 126, in the general manner described above in reference to FIG. 5. However, in the notebook computer 120, the left end of the privacy filter 122 extends between a curved inner guide 144 and a curved outer guide 146. When the portion of the privacy filter 122 extending in front of the LCD 128 is moved to the left, in the direction of arrow 140, the left end of the privacy filter 112 is moved into a cavity 148 extending behind the diffuser 133.

Preferably, the privacy filter 122 is long enough to extend between the curved guides 144, 146 regardless of the position in which the privacy filter 122 is held, with contact between the privacy filter 122 and the guides 144, 146 providing sufficient frictional force to hold the privacy filter 122 in place. Thus, a latching mechanism, as explained above in reference to FIG. 6, is not required, and the sliding bar 138 is used to move the privacy filter 122 from any position.

The first and second embodiments of the present invention have an advantage over various prior-art devices using a privacy filter installed over the display screen in that the privacy filter is easily moved away from the display screen for ease of system use in situations where this kind of privacy is not required. This advantage is particularly important when the display system is applied within a notebook computer, which is typically used in locations requiring different levels of privacy.

U.S. Pat. No. 5,488,496 also describes a display device having a privacy filter which is moved away from the display screen. However, the first and second embodiments of the present invention have an additional advantage of not requiring the complexity of attaching the privacy filter to one side of a clear belt, which is stretched over a pair of rollers, and which must be moved and tracked with the rollers as they are turned. Also, these embodiments of the present invention allow the display screen to be viewed directly when the privacy filter is moved away, without an intervening clear belt surface.

Figure 1:
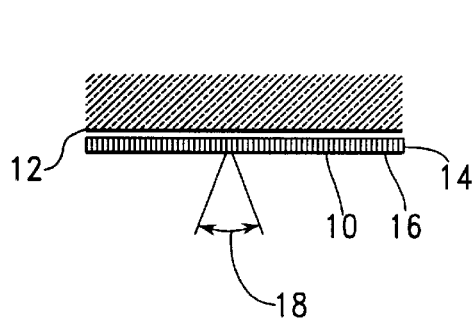
FIG. 1 is a fragmentary cross-sectional view of a first type of prior art privacy filter placed in front of a computer screen.
Figure 2:
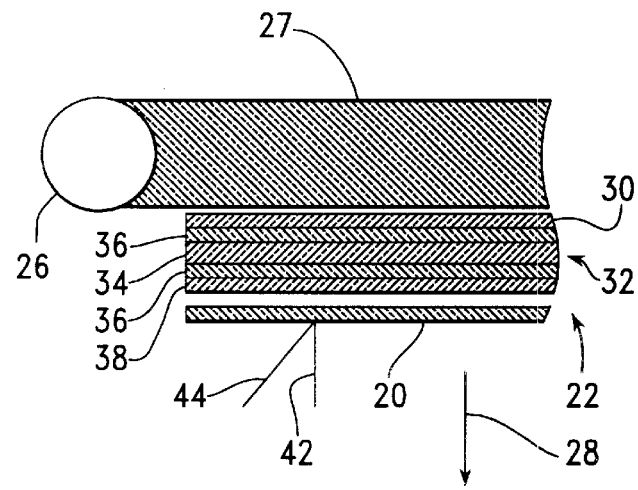
FIG. 2 is a fragmentary cross-sectional view of a second type of privacy filter placed in front of a liquid crystal display screen.
Figure 9:
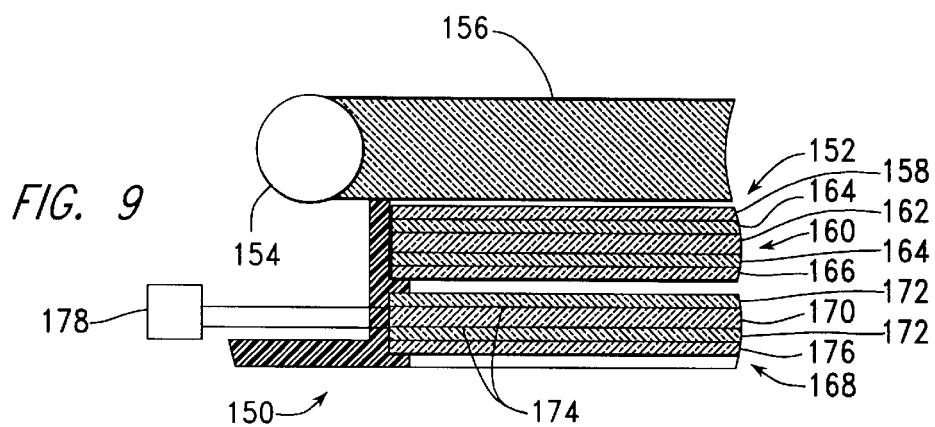
FIG. 9 is a fragmentary cross-sectional plan view of a notebook computer built in accordance with a third embodiment of the present invention to include an electrically switchable privacy filter.

FIG. 9 is a fragmentary cross-sectional plan view of a notebook computer 150 built in accordance with a third embodiment of the present invention. The display of the notebook computer 150 includes a conventional LCD display 152, operating generally as described in reference to FIG. 2 to produce a color or monochrome image from light emitted by one or more light sources 154, which illuminates the LCD display 152 from behind through a diffuser 156. Light from the diffuser is polarized as it is transmitted through an inner polarizing filter 158. In areas to be illuminated, this polarized light from the inner polarizing filter 158 is transmitted through the liquid crystal panel 160, including liquid crystal material 162 between glass plates 164, and through a second polarizing filter 166, since this polarized light is plane polarized with the second polarizing filter 166. However, in areas corresponding to a darkened image to be produced, an electric field is placed across electrodes within the glass plates 164, causing liquid crystals in the liquid crystal material 162 to become aligned in a manner causing the rotation of polarized light transmitted from the diffuser 156, so that such light becomes cross-polarized with the front polarizing filter 166. Thus, within such image areas a substantial portion of the light is absorbed within the front polarizing filter 166.

In accordance with the third embodiment of the present invention, the notebook computer 150 also includes a liquid crystal device 168 which is used to form an electrically switchable privacy filter. The liquid crystal device 168 includes liquid crystal material 170 extending between a pair of glass plates 172. Electrodes 174, extending within the glass plates 172, are used to produce an electric field which is uniform within the liquid crystal material 170, but which can be varied in intensity. This electric field is used to rotate the polarized light passing through the liquid crystal device 168, coming from the illuminated areas of the image produced within the LCD, so that this light is at least partially cross-polarized with a third polarizing filter 176. Preferably, a voltage source 178, connected to the. Electrodes 174, produces a variable voltage under control of the user of the notebook computer 150, with the highest voltage giving the greatest degree of cross-polarization between the polarized light coming from illuminated areas of the image produced by the LCD display 152, so that the illuminated image is darkened to the maximum extent and so that the effective viewing angle is reduced to a minimum value to afford maximum privacy. When no voltage is placed across the electrodes 174, polarized light is not rotated as it is transmitted through the liquid crystal device 168, providing a maximum viewing angle for ease of use of the computer 150, while not providing for privacy. Intermediate levels of voltage produce intermediate effects, allowing the user to vary these effects, balancing the degree of privacy required with his own difficulty (if any) of reading data displayed on the LCD display 152.

Alternately, the orientation of the third polarizing filter 176 may be changed so that the application of an electric field within the liquid crystal device 168 is used to bring the polarized light coming from illuminated areas of the image produced by the LCD display 152 into plane polarization with the third polarizing filter 176 through rotation of the direction of polarization of the light. Then, a maximum level of privacy would be achieved without the application of the electric field across the electrodes 174. This type of operation may be preferable in an application where a maximum level of privacy is needed, as in an airplane seat, when the notebook computer 150 is operated on its own battery power, placing an emphasis on a need to conserve power.

The voltage source 178 may be made variable under the control of the user in a number of ways well known in the art of such electronic circuits. For example, a potentiometer may be used as part of a voltage dividing circuit determining the output voltage, or a subroutine executing within a processor in the computer 150 may cause a number to be stored in a register within system memory, a digital-to-analog convertor producing a voltage in response to the number, and with the voltage source 178 being driven to produce a voltage equal to that of the digital-to-analog convertor.

The third embodiment of the present invention has an advantage over various prior-art devices using a privacy filter installed over the display screen in that the privacy filter can effectively be switched on an off. Again, this advantage is particularly important in a notebook computer application, as such systems are typically used in situations both requiring and not requiring this kind of privacy.

U.S. Pat. No. 6,211,930 describes apparatus for switching the effective angle through which an LCD display can be read. However, the third embodiment of the present invention has an advantage, when compared to the apparatus of this patent, of not requiring the light used to backlight the LCD screen for viewing at a wide angle to be first collimated and then diffused. This advantage is particularly important in its application to a notebook computer, which must often be operated on battery power, instead of in the application to an ATM (automated teller machine) terminal, as described in the patent.

While the invention has been shown in its preferred forms or embodiments with some degree of particularity, it is understood that this description has been given only by way of example and that numerous changes in the details of construction and use, including changes in the combination and arrangement of parts, may be made without departing from the spirit and scope of the invention.

What is claimed is:

1. Display apparatus for a notebook computer including a forward extending lower portion having a number of keys to be depressed for providing a user input, and an upper portion pivotally mounted along a rear edge of said forward-extending lower portion to extend upward from said forward extending lower portion when said upper portion is opened, wherein said display apparatus comprises:

a display panel including a display surface, wherein said display panel causes a visible image to be produced on said display surface in response to electrical signals generated within said computing system;

a display cover extending around said display panel, wherein said display cover includes a window outwardly exposing said display surface and a cavity extending from a first end of said window to a closed end of said cavity, wherein said display panel and said display cover form portions of said upper portion of said notebook computer, and wherein a portion of said display cover extending around said cavity extends forward from a portion of said display cover extending around said window and above said forward extending lower portion when said upper portion is opened;

a privacy filter including a filter sheet, wherein said privacy filter is movable between a closed position with said filter sheet extending to cover said display surface and an open position exposing said display surface through said window, wherein a first portion of said privacy filter in said open and closed positions extends into said cavity, and wherein said filter sheet limits a viewing angle through which said visible image is discernible; and a roll rotatably mounted within said cavity, wherein a first end of said privacy filter is attached to a peripheral surface of said roll, wherein rotating said roll in a first direction wraps an increasing portion of said privacy filter around said roll, moving said privacy filter from said closed position to said open position, and rotating said roll opposite said first direction unwraps an increasing portion of said privacy filter from said roll, moving said privacy filter from said open position to said closed position.

2. The display apparatus of claim 1, additionally comprising a spring causing said roll to rotate in said first direction, and a latch holding said privacy filter in said closed position, wherein said spring moves said privacy filter from said closed position to said open position when said latch is released with said privacy filter in said closed position.

3. The display apparatus of claim 2, wherein
said privacy filter includes a bar attached to an end of said privacy filter opposite said first end of said privacy filter, and
said latch engages said bar as said privacy filter is moved into said closed position.

4. The display apparatus of claim 1, additionally comprising a motor driving said roll in said first direction and, alternately, opposite said first direction.

5. The display apparatus of claim 4, additionally comprising:
means for accepting a first user input for opening said privacy filter and a second user input for closing said privacy filter;
a first detector providing a first signal indicating that said privacy filter is in said open position, wherein said motor drives said roll in said first direction in response to said first user input until said first signal is provided; and
a second detector providing a second signal indicating that said privacy filter is in said closed position, wherein said motor drives said roll in said second direction in response to said second user input until said second signal is provided.

6. The display apparatus of claim 1, additionally comprising:
a first slot extending along a first edge of said window, wherein said first edge of said window extends from said first end of said window, and wherein a first edge portion of said privacy filter slides within said first slot; and
a second slot extending along a second edge of said window, wherein said second edge of said window extends opposite said first edge of said window, and wherein a second edge portion of said privacy filter slides within said second slot.

7. The display apparatus of claim 1, wherein said filter sheet includes a plurality of transparent sections separated by louvers.

8. The display apparatus of claim 1, wherein said display panel includes a liquid crystal display causing an illuminated portion of said visible image to be polarized in a first plane, and said filter sheet includes a polarizer cross polarized with light polarized in said first plane.

9. Display apparatus for a computing system, comprising:
a display panel including a display surface, wherein said display panel causes a visible image to be produced on said display surface in response to electrical signals generated within said computing system;
a display cover extending around said display panel, wherein said display cover includes a window outwardly exposing said display surface and a cavity extending from a first end of said window to a closed end of said cavity, wherein said cavity includes a rear cavity portion extending along a side of said display panel opposite said display surface;
a privacy filter including a filter sheet, wherein said privacy filter is movable between a closed position with said filter sheet extending to cover said display surface and an open position exposing said display surface through said window, wherein a first portion of said privacy filter in said open and closed positions extends into said cavity, and wherein said filter sheet limits a viewing angle through which said visible image is discernible; and
a curved deflector deflecting a portion of said privacy filter into said rear cavity portion as said privacy filter is moved from said open position into said closed position.

10. The display apparatus of claim 9, wherein said privacy filter includes a bar for moving said privacy filter, extending outward from an end of said privacy filter opposite said first portion of said privacy filter.

11. The display apparatus of claim 10, wherein said privacy filter is held in place by frictional contact between said privacy filter and said curved deflector.

12. The display apparatus of claim 9, additionally comprising:
a first slot extending along a first edge of said window, wherein said first edge of said window extends from said first end of said window, and wherein a first edge portion of said privacy filter slides within said first slot: and
a second slot extending along a second edge of said window, wherein said second edge of said window extends opposite said first edge of said window, and wherein a second edge portion of said privacy filter slides within said second slot.

* * * * *